Figure 1:
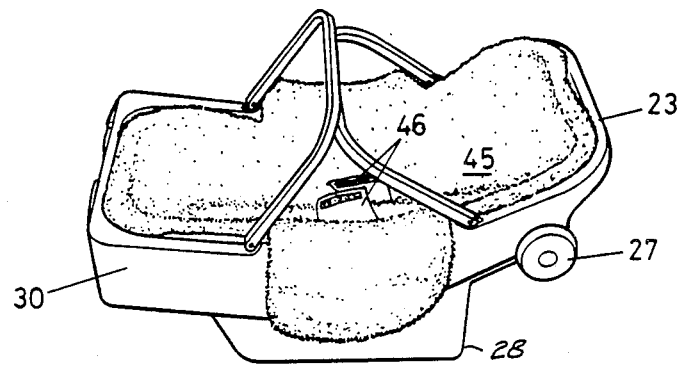

United States Patent [19]

Heath et al.

[11] Patent Number: 4,681,368
[45] Date of Patent: Jul. 21, 1987

[54] CHILD RESTRAINT BASSINET

[75] Inventors: Robert B. Heath; Colin M. Nagel, both of Lonsdale, Australia

[73] Assignee: Safe-N-Sound Pty. Limited, South Australia, Australia

[21] Appl. No.: 788,069

[22] Filed: Oct. 16, 1985

[30] Foreign Application Priority Data

Oct. 19, 1984 [AU] Australia ............................. PG7727

[51] Int. Cl.⁴ .......................... A47D 7/04; B60R 21/10
[52] U.S. Cl. ................... 297/250; 297/216; 5/94; 5/118
[58] Field of Search ............... 5/94, 118, 431; 297/216, 252, 250

[56] References Cited

U.S. PATENT DOCUMENTS

| 2,735,476 | 2/1956 | Fieber. |
| 2,777,531 | 1/1957 | Erickson. |
| 3,645,548 | 2/1972 | Briner. |
| 4,085,963 | 4/1978 | Bullerkieck. |
| 4,099,770 | 7/1978 | Elsholz et al. ............... 297/216 |
| 4,186,961 | 2/1980 | Farrell, Jr. et al. ........... 297/216 |
| 4,345,791 | 8/1982 | Bryans et al. ............. 297/216 X |
| 4,348,048 | 9/1982 | Thévenot .................... 297/250 |
| 4,383,713 | 5/1983 | Roston. |
| 4,429,916 | 2/1984 | Hyde et al. .............. 297/216 X |
| 4,501,032 | 2/1985 | Heath et al. ................... 5/94 |

FOREIGN PATENT DOCUMENTS

| 2303682 | 10/1976 | France ........................... 5/94 |
| 2306853 | 11/1976 | France ........................... 5/94 |
| 1478323 | 6/1977 | United Kingdom. |
| 1518108 | 7/1978 | United Kingdom. |
| 2104783 | 6/1985 | United Kingdom. |

Primary Examiner—William F. Pate, III
Assistant Examiner—R. Chilcot
Attorney, Agent, or Firm—Brown, Martin, Haller & Meador

[57] ABSTRACT

A child restraint bassinet assembly comprising a support base and a bassinet which hinges in the support base upon release of an inertia responsive trigger latch which has sufficient inertia to move to a release position upon impact, the assembly being retained in a vehicle by a base strap of a tether strap assembly, which is located sufficiently high that the center of gravity of the bassinet is below the base strap and tilting is thereby limited to downward movement of the rear end of the bassinet within its base.

10 Claims, 4 Drawing Figures

CHILD RESTRAINT BASSINET

This invention relates to a child restraint bassinet assembly and in particular it is directed to improvements in the bassinet assembly which was described, illustrated and claimed in our U.S. Pat. No. 4,501,032.

In that specification there was described a bassinet assembly having a support base and a bassinet carried by the support base for relative hinging movement by engagement of pins on one of the bassinet and support base engaging the surfaces of hooks on the other, there being provided both a trigger latch which acted between the support base and bassinet and which had such inertia that upon impact the trigger latch moved to disengage from between the support base and bassinet so that the bassinet moved with respect to the support base and its movement was arrested by engagement of surfaces of the bassinet against surfaces of the base, but only after the bassinet had tilted. There was also described a finger latch on the bassinet which had an engagement position and a release position, and had an upwardly facing surface which engaged a downwardly facing surface on the support base.

This invention relates to further improvements in that said described invention, and has as its main object the provision of means whereby the risk of incorrect tilting upon impact is substantially reduced. It will be appreciated by the reader that the assembly described in the earlier specification was arranged to rest upon the seat of a motor vehicle, and although a more than adequate factor of safety existed between the base and bassinet, nevertheless it was possible for the base to depress the soft cushion of a motor vehicle seat upon impact, and this caused a tendency of the bassinet to rotate in the opposite direction from the direction in which it was required to tilt, thereby slightly reducing the effectiveness of that tilt. It is of course most desirable that the tilt should be such that the weight of a child or baby carried in the bassinet should be spread over as wide an area as possible, and that area should be generally normal to the direction of deceleration forces. The main object of this invention is to provide improvements whereby the possibility of tilting in the wrong direction of the bassinet is largely inhibited, and in one embodiment the invention is characterised by a tether strap assembly, means retaining the strap assembly to the forward end of the base, and anchor means which, in use, retain the bassinet assembly in a vehicle with its centre of gravity wholly below the strap assembly. Conveniently the tether strap assembly can be associated with a two part buckle so that it can be quickly and easily removed from a vehicle.

With this arrangement, the centre of gravity, being below the tether strap assembly, will cause a tilting moment to be imparted to the bassinet which is in the same direction as the tilting moment otherwise imparted due to release of the trigger latch, and there is less danger of the reaction to impact forces being other than normal to the direction of those deceleration forces. This is a matter which is regarded as being important for the safety for a child or baby carried in the bassinet.

It is very desirable that a baby should be retained in a bassinet in a safe manner, and it is undesirable that the baby should be free to roll over in the bassinet to be face down for example. In another embodiment of this invention there is provided a wide body belt having two flaps which extend into the bassinet from the corners between the base and side walls thereof and which interengage over a wide area of a baby. If the belt is so positioned that it engages the trunk of a baby from beneath its armpits, then the danger of a baby becoming incorrectly positioned within the bassinet is substantially reduced.

In another embodiment of the invention the finger latch and the trigger latch are both carried by the base, and this simplifies construction and avoids the need for the finger latch to be transported along with the bassinet, together with consequential possibility of the finger latch mechanism being rendered partly inoperative for example due to fabric becoming wedged in the finger latch mechanism.

Figure 2:
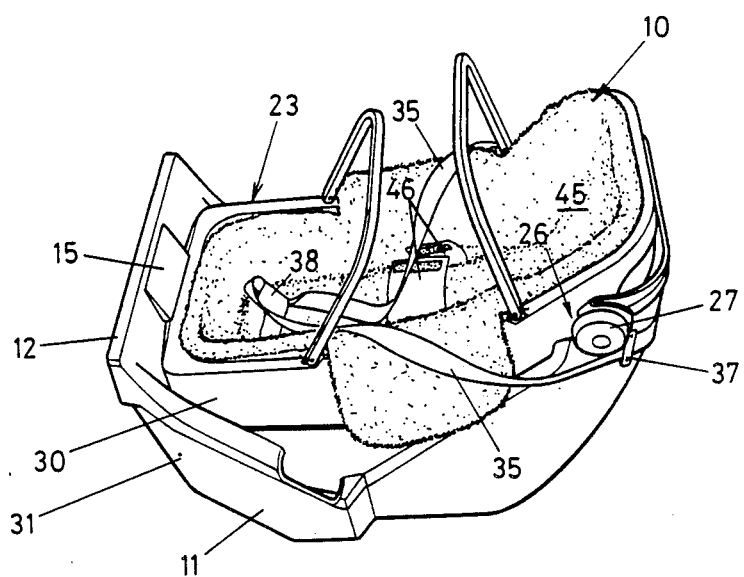
Figure 3:
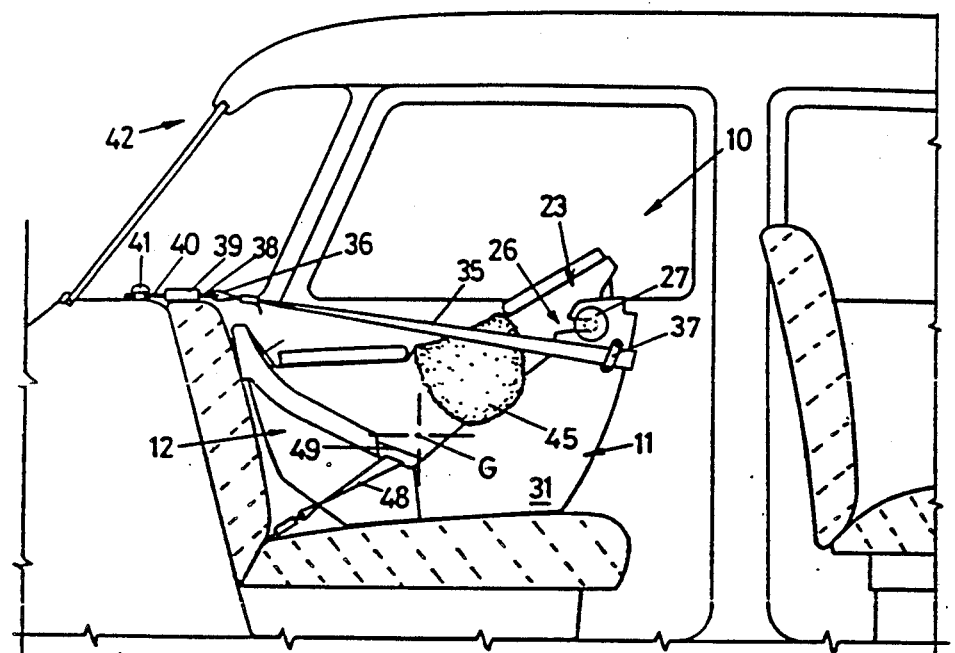
Figure 4:
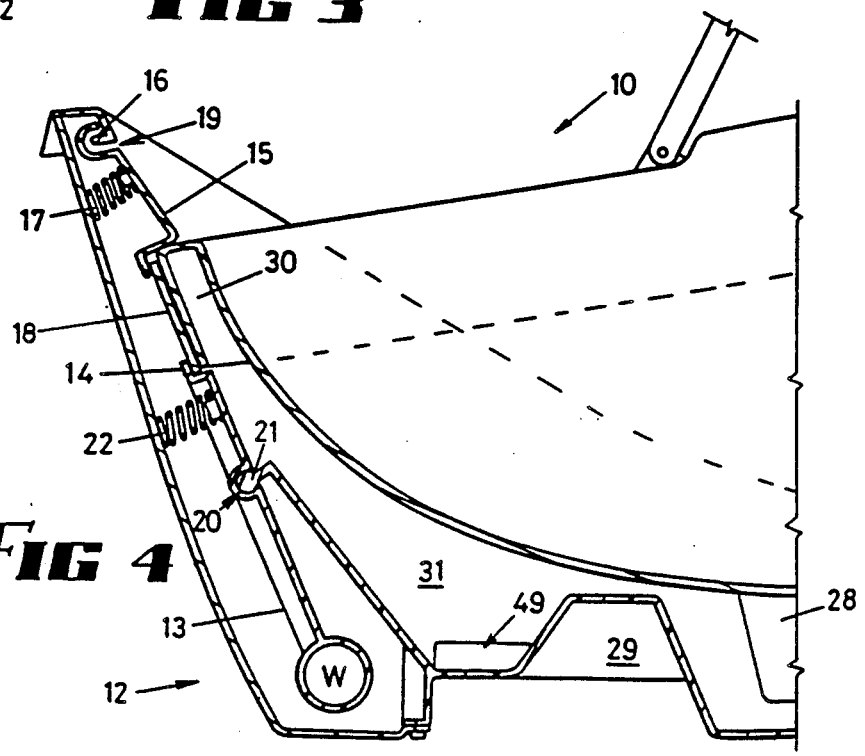

An embodiment of the invention is described hereunder in some detail with reference to, and is illustrated in, the accompanying drawings, in which FIG. 1 is a perspective view of a bassinet in its "carry mode", FIG. 2 is a similar view, showing the bassinet in position in a base, which is adapted to be retained in a motor vehicle, FIG. 3 is a fragmentary sectional view of a motor vehicle, showing a bassinet assembly retained therein, both by a base strap and a seat belt, the latter being part of the motor vehicle original equipment, and FIG. 4 is a fragmentary elevational section through the rear end of the bassinet assembly.

In this embodiment, a bassinet assembly 10 comprises a base 11 and a bassinet 23 therein. The bassinet 23 is a dish-like moulding which is contained in the base 11 as described below:

The rear end 12 of the base 11 (the end which in use will abut the seat squab) is provided with a swinging arm 13 having a weight 'W' on its lower end, the inertia of which releases a trigger latch 14 on the upper end of arm 13 upon impact. Above the trigger latch 14 there is also provided a finger latch 15 also carried by the base 11, and comprising a plate-like member hinged at its upper end about a transverse axis to a rearwardly facing projection 16 on the rear wall of the base 11, and spring loaded forwardly by spring 17 which co-acts between the hinged finger latch 15 and a cover plate 18 secured to the rear end of the base moulding. The finger latch 15 has a recess 19, the surface of which engages projection 16 for this pivotal movement.

The trigger latch 14 is hinged intermediate its ends to pivot about a transverse axis, the axis being defined between a transverse recess 20 in the finger latch arm 13 and a rearwardly facing transverse projection 21 on the rear wall of the base 11, and the finger latch arm is urged towards its latching position by spring 22. The lower end of the trigger latch arm carries a small weight 'W', the inertia of which will cause pivotal movement of the finger latch arm upon impact of a vehicle in which the assembly is carried, and that pivotal movement will compress the spring 22 and move the trigger latch 14 to a release position, wherein bassinet 23 can pivot as described below:

Near the front end of the assembly, the base 11 is provided with rearwardly facing hook-like recesses 26 and these are engaged by respective headed pins 27 outstanding from the side walls of the bassinet, the pins being retained in position by the trigger latch 14 and finger latch 15. However when inertia causes the trigger latch to release, the pins function as trunnion means about which the bassinet 23 will pivot downwardly and forwardly with respect to its base 11. In order to absorb the energy caused by such impact, the initial movement of the bassinet will be slightly arrested by depending webs 28 which project downwardly from the floor of the bassinet 23 near its rear end, and thereafter pierce the base wall or deflect it to abosrb some energy. A further stage of energy absorption occurs when the bassinet encounters a "blister" 29 which projects upwardly and inwardly from the floor of the base 11 near its rear end, and finally the side walls 30 of the bassinet and side walls 31 of the base will deform upon a wedging or jamming of these members together. This multistage impact absorption provides means whereby the effect of the vehicle impact upon the occupant of the bassinet is substantially reduced.

As said above, the effectiveness of tilting may be inhibited if the bassinet assembly causes depression of the front of the seat which supports it. However in this embodiment, the base of the bassinet is provided with a tether strap assembly which includes a base strap 35 which comprises a belt loop (or pair of belts arranged in a 'V' formation), which extends around the front wall of the base 11 near its front upper end, and slope upwardly and rearwardly towards an anchor strap 36 which is joined thereto. The base strap loop 35 is retained in position by saddles 36 on the base, and the base strap loop passes through a second loop in the anchor strap 36, (which, with base strap 35, comprise the tether strap assembly), the other end of which passes through a length adjustment buckle male portion 38 and this is engageable with a buckle female portion 39, the rear end of which is coupled to an anchor member 40, having a 'keyhole' type slot engageable over the head of an anchor stud 41 which is secured at a suitable location in a vehicle, for example as shown on the "parcel shelf" beneath the rear vision window opening of a vehicle 42.

It is furthermore desirable that the bassinet not become disengaged from the base during an impact. This may be accomplished by means of retaining rings or caps (not shown), but so positioned on the base strap 35 as to control its position during an impact.

The bassinet is desirably lined with a soft liner 45, for example a lambswool or similar liner, and this contains slits near the corners between the side walls and the bottom of the bassinet, and a wide body belt 46 projects from beneath the bassinet and through those slits to engage over the trunk of a baby or child, extending in a direction towards its feet from a location beneath the armpits. Since the belt is not likely to be required to perform any impact resisting function, but merely to restrain the child in the correct position in the bassinet, the fastening of the two flaps is sufficiently achieved by a hook type of fastener, for example that is sold under Registered Trade Mark VELCRO.

As shown in FIG. 3, an adult seat belt restraint 48 (or original equipment seat belt) additionally secures the base 11 to the vehicle, passing through apertures 49 therein positioned to provide restraint of the base in a rearward and downward direction. The apertures 49 guide the belt 48 to lie upwardly and forwardly from its anchorage, and loop behind the base, so that there is no interference by the belt against the hinging movement of the bassinet 23 within the base 11.

Upon impact, the deceleration forces are resisted by both the base strap 35 and the adult restraint seat belt 48, and rotational displacement of the front part of the base in a downward direction is inhibited, and rotational displacement of the rear part of the base in a downward direction is assisted.

A consideration of the above embodiment will indicate that the invention is very simple but nevertheless results in marked improvements to a bassinet assembly.

We claim:

1. A child restraint bassinet assembly comprising a support base having a rear end for abutting a vehicle seat back and a forward end facing in the direction of motion of the vehicle, a bassinet, hinge means between the bassinet and the support base, an inertia responsive trigger latch engageable between the base and bassinet which normally inhibits swivelling movement of the bassinet, but, upon actuation, releases the bassinet for downward hinging movement with respect to the base, and a finger latch cooperating with the base and bassinet to either retain the bassinet within the base or release it from the base, a tether strap assembly which includes a base strap, means retaining the base strap to an upper portion of the forward end of the base, and anchor means for securing the base strap to a vehicle at a point above the rear end of the base and thereby retaining the bassinet assembly in the vehicle, with its centre of gravity 'G' wholly below the base strap, the anchor means comprising an anchor stud for securing to the vehicle above the rear end of the base, an anchor strap secured to the base strap, and an anchor member on the anchor strap for securing the anchor strap to the anchor stud.

2. A child restraint bassinet assembly according to claim 1 further wherein said means retaining the base strap to the support base comprise saddles secured to the support base near its front end and top edge.

3. A child restraint bassinet assembly according to claim 1 wherein said anchor means further comprises a releasable buckle between the anchor strap and anchor member.

4. A child restraint bassinet assembly according to claim 1 further comprising pivot means between the upper end of finger latch and the rear end of support base for hinging of finger latch to the support base about a transverse axis.

5. A child restraint bassinet assembly according to claim 4 wherein said pivot means comprise a rearwardly facing transverse projection on the base near the rear end thereof, engaged by forwardly facing walls of a recess in the finger latch.

6. A child restraint bassinet according to claim 4 further comprising by a cover plate secured to the rear end of the base, and a spring co-acting between the cover plate and finger latch.

7. A child restraint bassinet assembly according to claim 1 wherein said bassinet has side walls, said finger latch engaging an upper surface of a said side wall, and said trigger latch engaging a lower surface of that said side wall.

8. A child restraint bassinet according to claim 7 wherein said trigger latch comprises an arm pivoted to the base by transverse pivot means, and a spring co-acts between the cover plate and arm.

9. A child restraint bassinet according to claim 1 further comprising surfaces on the bassinet and the support base which engage upon release of the trigger latch, said surfaces comprising surfaces of an upstanding blister on the base, and depending webs which depend from bassinet.

10. A bassinet assembly according to claim 1, further comprising a soft liner and a releasable soft body belt in the bassinet.

* * * * *